(12) United States Patent
Kamogi (10) Patent No.: US 7,944,108 B2
(45) Date of Patent: May 17, 2011

(54) BRUSHLESS MOTOR AND ACTUATOR USING IT

(75) Inventor: Yutaka Kamogi, Tottori (JP)

(73) Assignee: Panasonic Corporation, Osaka (JP)

( * ) Notice: Subject to any disclaimer, the term of this patent is extended or adjusted under 35 U.S.C. 154(b) by 136 days.

(21) Appl. No.: 12/522,985

(22) PCT Filed: Jul. 10, 2007

(86) PCT No.: PCT/JP2007/063711
§ 371 (c)(1),
(2), (4) Date: Jul. 13, 2009

(87) PCT Pub. No.: WO2008/087757
PCT Pub. Date: Jul. 24, 2008

(65) Prior Publication Data
US 2010/0052453 A1    Mar. 4, 2010

(30) Foreign Application Priority Data

Jan. 18, 2007    (JP) ................. 2007-008824

(51) Int. Cl.
H02K 21/12    (2006.01)
H02K 16/00    (2006.01)
H02K 1/06    (2006.01)

(52) U.S. Cl. .............. 310/156.26; 310/114; 310/156.12; 310/156.13; 310/156.36; 310/156.37; 310/216.025; 310/216.111

(58) Field of Classification Search .................. 310/114, 310/126, 156.12–156.13, 156.26, 156.31, 310/156.36–156.38, 156.72–156.73, 216.023, 216.025, 216.111, 263
See application file for complete search history.

(56) References Cited

U.S. PATENT DOCUMENTS 2,857,779 A * 10/1958 Frei ................................ 74/466
3,148,319 A *  9/1964 Fredrickson .................. 318/701

FOREIGN PATENT DOCUMENTS

JP    H01-64969 U    4/1989
JP    07-212996 A    8/1995

OTHER PUBLICATIONS

International Search Report issued Oct. 9, 2007 in International application No. PCT/JP2007/063711, 1 page.

* cited by examiner

Primary Examiner — Quyen Leung
Assistant Examiner — Jose A Gonzalez Quinones
(74) Attorney, Agent, or Firm — Brinks Hofer Gilson & Lione (57) ABSTRACT

A motor for driving an actuator used such as for a throttle valve of an automobile engine and an optical axis controller of an automobile headlight. In two cup-shaped rotor yokes each provided with an internal diameter enlarged part at its opening, a ring-shaped joint material with an external diameter fitting into this internal diameter enlarged part is inserted into the internal diameter enlarged part to form a rotor yoke assembly. A motor is available with high durability against vibration and shock owing to high accuracy in dimensions, lightweight, and high rigidity of the rotor.

10 Claims, 10 Drawing Sheets

BRUSHLESS MOTOR AND ACTUATOR USING IT

TECHNICAL FIELD

The present invention relates to a brushless motor for driving an actuator used such as for a throttle valve of an automobile engine and an optical axis controller of an automobile headlight. More particularly, the invention relates to the structure of a rotor with its responsivity and durability against vibration and shock improved.

BACKGROUND ART

A motor for driving an actuator used such as for a throttle valve of an automobile engine and an optical axis controller of an automobile headlight requires high responsivity and durability against vibration and shock. Hence, a motor is devised with its responsivity and durability against vibration and shock improved by reducing the inertia moment and weight of the rotor with a steel plate used for the rotor yoke. (Refer to patent literature 1, for example.)

Figure 8:
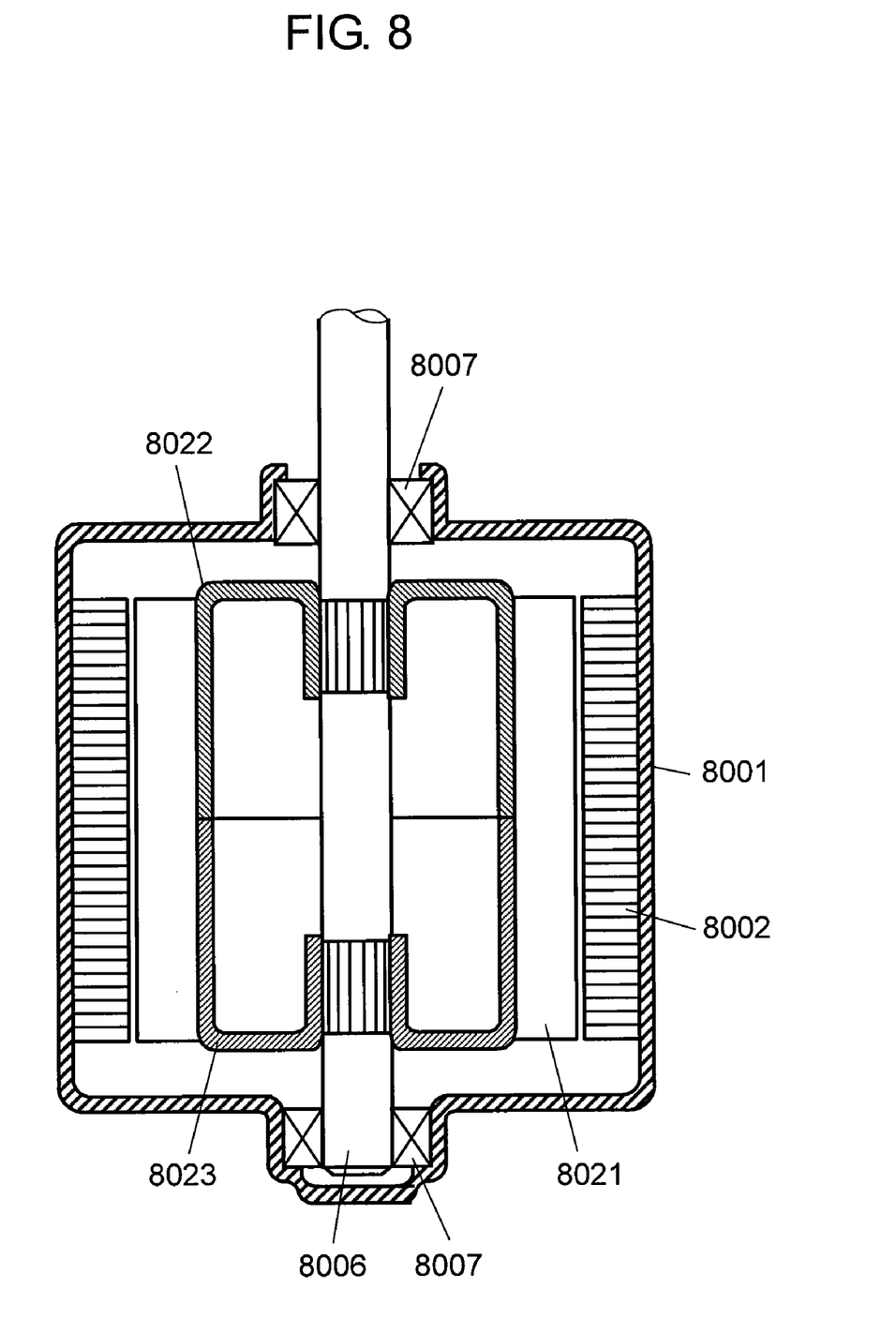
FIG. 8 is a cross-sectional structural drawing of a conventional motor.

As a first example of a conventional motor, the structure of a motor described in above-described patent literature 1 is shown in FIG. 8. In FIG. 8, the stator is composed of yoke bracket 8001 and iron core 8002 fixed onto the inner circumferential surface of yoke bracket 8001, with a coil wound therearound. The rotor is composed of magnetic plate materials 8022, 8023 molded in a hollow, circular shape as a rotor yoke; magnet 8021, tubular, fixed onto the outer circumferential surface of magnetic plate materials 8022, 8023; and shaft 8006 fixed penetrating through the central portion of magnetic plate materials 8022, 8023. Both ends (two positions) of yoke bracket 8001 have bearings 8007 arranged thereon rotatably supporting shaft 8006 of the rotor.

In the motor described in above patent literature 1, the inertia moment is reduced with a magnetic plate material in a hollow, circular shape used as the rotor yoke to enhance the starting performance and responsivity, while supporting a lightweight rotor at two positions outside the rotor yoke to be resistant to vibration and shock.

However, in the conventional structure shown in above-described patent literature 1, the rotor yoke is bisected and combined, which causes impossible assembling of the rotor magnet and/or imbalance of the rotor due to the difference in the direction (phase) of outer circumferential deflection of the two parts.

Figure 9:
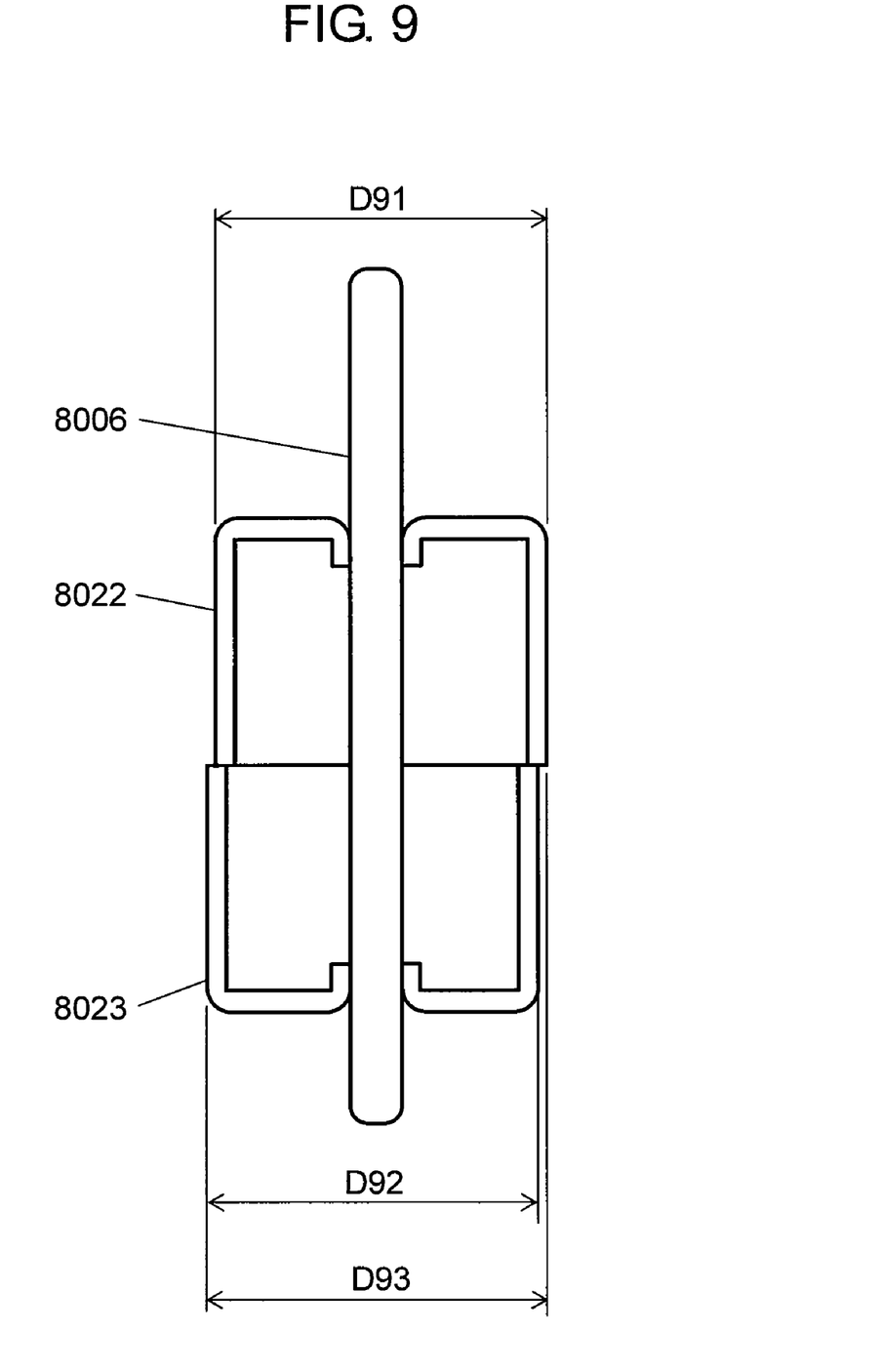
FIG. 9 is a cross-sectional structural drawing of the rotor yoke of a conventional motor.

FIG. 9 illustrates this problem. FIG. 9 shows a part of the rotor excerpted from FIG. 8, where a component same as that in FIG. 8 is given the same reference mark as that in FIG. 8.

In FIG. 9, when shaft 8006 is fixed by press-fitting into or bonding to magnetic plate materials 8022, 8023, both materials are very rarely fixed in a zero-degree perpendicularity, but are fixed with some inclination. The degree and direction (phase) of the inclination are different between magnetic plate materials 8022, 8023, and thus effective maximum external diameter D93 of the rotor is larger than respective external diameters D91, D92 of materials 8022, 8023. This causes impossible assembling of tubular magnet 8021 formed with its internal diameter slightly larger than D91 and D92 so as to fit with the rotor yoke.

The inclination of shaft 8006 from magnetic plate materials 8022, 8023 causes outer circumferential deflection of magnetic plate materials 8022, 8023, undesirably resulting in imbalance of the rotor.

Figure 10:
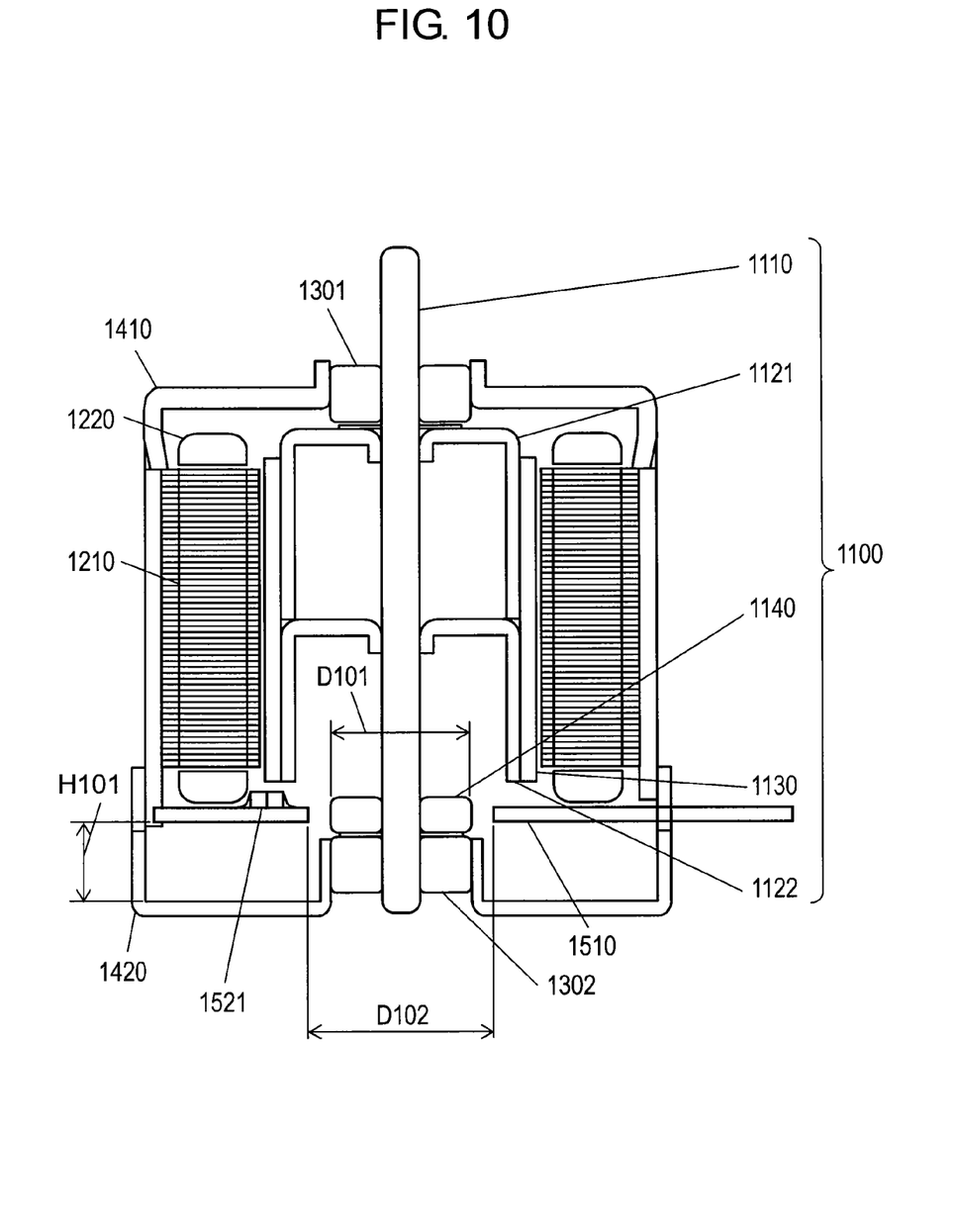
FIG. 10 is a cross-sectional structural drawing of a conventional motor.

As a second example of a conventional motor, the structure of another motor in practical use is shown in FIG. 10. Here, FIG. 10 shows a brushless motor in which electronic components are incorporated.

In FIG. 10, the stator is composed of frames 1410, 1420 and iron core 1210 fixed onto the inner circumferential surface of frames 1410, 1420, with coil 1220 wound therearound. Rotor 1100 is composed of rotor yokes 1121, 1122 molded in a cup shape, stacked in the same direction; shaft 1110 fixed penetrating through the central portion of rotor yokes 1121, 1122; and tubular magnet 1130 fixed to the outer circumferential surface of rotor yokes 1121, 1122. Shaft 1110 further has thrust ring 1140 fixed thereto, composing a thrust bearing together with bearing 1302.

This thrust ring 1140 provides space H101 in the direction of the shaft penetrating for incorporating electronic components on printed-circuit board 1510, while setting diameter D102 of a hole bored in printed-circuit board 1510 to a minimum diameter larger than diameter D101 of the thrust ring, thereby ensuring a mounting area for electronic components.

Frames 1410, 1420 have bearings 1301, 1302 arranged thereon supporting shaft 1110 of rotor 1100, where rotor 1100 is rotatably retained. 1521 is a magnetoelectric transducer for detecting the position of the magnetic pole of magnet 1130, mounted on printed-circuit board 1510 to transmit a signal representing the position of the magnetic pole of the rotor to the motor driving circuit (not shown).

With the structure of this motor, the problem same as that in above-described patent literature 1 occurs. That is, the rotor yoke is bisected and combined, causing impossible assembling of the rotor magnet and/or imbalance of the rotor due to the difference in the direction (phase) of outer circumferential deflection of the two parts. Besides, thrust ring 1140 is required additionally, thus increasing the number of components. Further, durability against vibration and shock becomes dependent on the strength for fixing thrust ring 1140 to shaft 1110, thus decreasing reliability.

[Patent literature 1] Japanese Utility Model Unexamined Publication No. H01-64969 (Japanese Utility Model Publication No. S62-158767)

SUMMARY OF THE INVENTION

The present invention is to form the rotor of a motor for driving an actuator by the following method. That is, in two cup-shaped rotor yokes each provided with an internal diameter enlarged part at its opening, a ring-shaped joint material with an external diameter fitting into this internal diameter enlarged part is inserted into the part. Next, a shaft is fixed to each center of the two rotor yokes while linking the two rotor yokes to form a rotor yoke assembly. Then, a magnet is fixed to the outer circumference of the rotor yoke assembly.

In addition to the above-described structure, a printed-circuit board is provided mounting a magnetoelectric transducer for detecting the position of the magnetic pole of a magnet fixed to the rotor. An extended part with a diameter smaller than the internal diameter of the magnet is provided on the rotor yoke at the side facing this printed-circuit board. A hole larger than the diameter of the extended part of the rotor is provided in the center of the printed-circuit board to make the extended part of the rotor to penetrate through the hole. The end face of the extended part is used as a thrust bearing material.

In the present invention, the inertia moment and weight of a rotor are reduced to enhance responsivity while improving durability against vibration and shock, thereby solving the conventional problems.

REFERENCE MARKS IN THE DRAWINGS

1100 Rotor
1110 Shaft
1121, 1122 Rotor yoke
1121a, 1122a Projection
1121w, 1122w Internal diameter enlarged part
1123 Joint material
1124 Rotor yoke assembly
1130 Magnet
1210 Iron core
1220 Coil
1410, 1420 Frame

DETAILED DESCRIPTION OF THE PREFERRED EMBODIMENTS

Hereinafter, a description is made of preferred embodiments in reference to some drawings.

First Exemplary Embodiment

Figure 1:
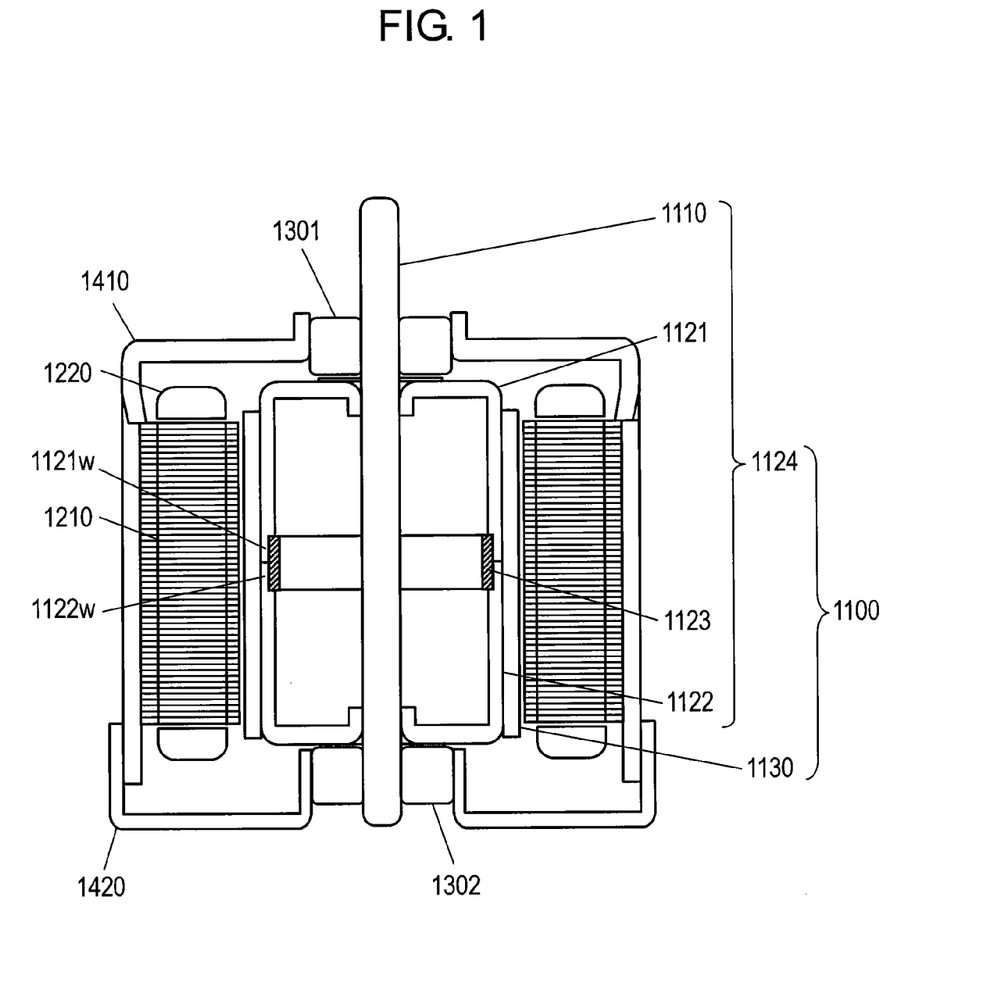
FIG. 1 is a cross-sectional structural drawing of a motor according to the first exemplary embodiment of the present invention.

FIG. 1 is a cross-sectional structural drawing of a motor according to the first exemplary embodiment of the present invention.

In FIG. 1, frame 1410 has the same function as that of yoke bracket 8001 in FIG. 8. The inner circumferential surface of frame 1410 has a stator fixed thereto made of iron core 1210 with coil 1220 wound therearound. Rotor yokes 1121, 1122 molded in a cup shape, provided with internal diameter enlarged parts 1121w, 1122w at the openings are linked with ring-shaped joint material 1123. Shaft 1110 penetrates through and fixes to the center of rotor yokes 1121, 1122 to form rotor yoke assembly 1124. The outer circumferential surface of rotor yoke assembly 1124 has tubular magnet 1130 fixed thereto to form rotor 1100. Frames 1410, 1420 have bearings 1301, 1302 arranged thereon for supporting shaft 1110 of rotor 1100, where rotor 1100 is rotatably retained.

Figure 2:
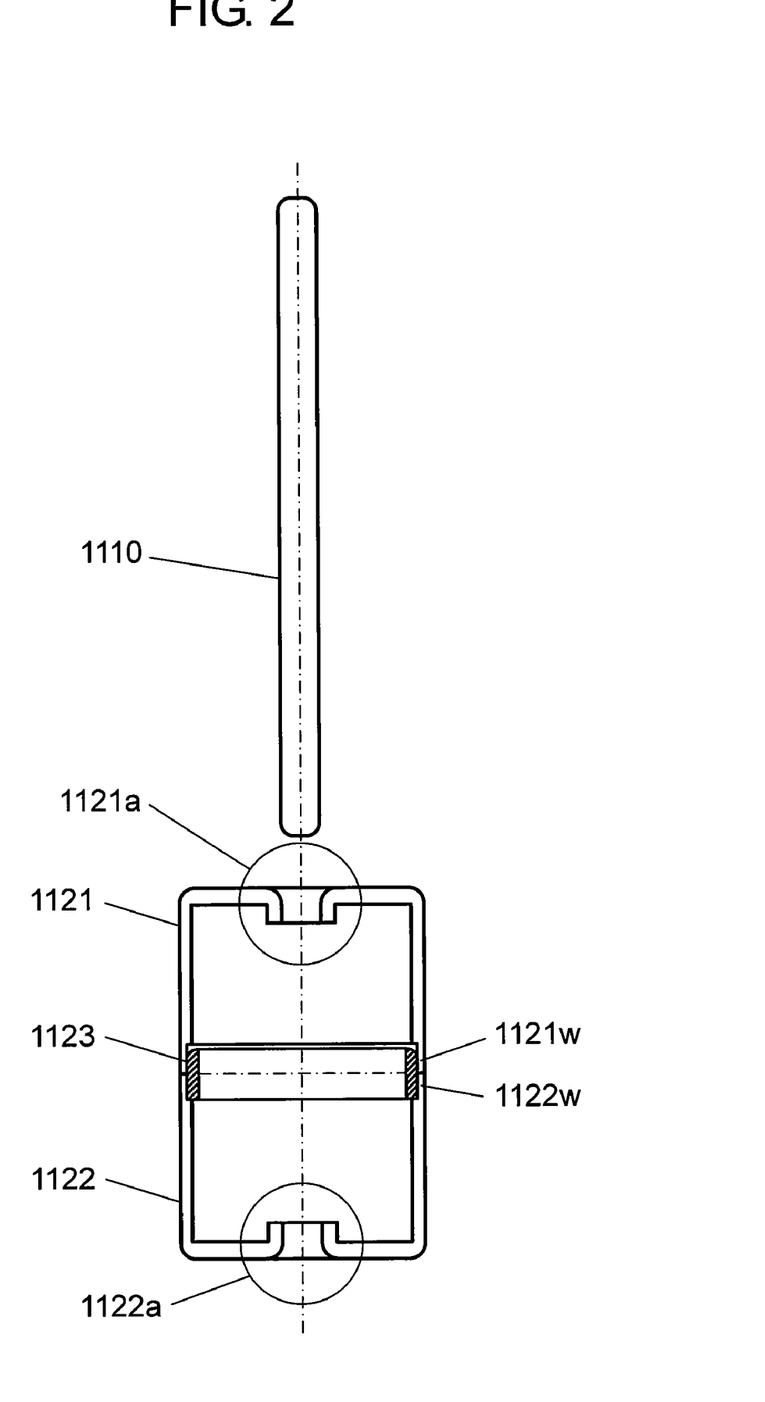
FIG. 2 is a cross-sectional structural drawing for illustrating a method of assembling a rotor yoke according to the first embodiment of the present invention.

FIG. 2 is a cross-sectional structural drawing for illustrating details and a method of assembling rotor yoke assembly 1124 composed of rotor yokes 1121, 1122, joint material 1123, and shaft 1110 in FIG. 1.

In FIG. 2, rotor yokes 1121, 1122 molded in a cup shape, having projections 1121a, 1122a for fixing (press-fitting) shaft 1110 at their center, are linked with joint material 1123 to be unified before fixing (press-fitting) shaft 1110.

In this case, as a result that the external diameter of joint material 1123 is made slightly smaller than the diameter of internal diameter enlarged parts 1121w, 1122w at the openings of the rotor yoke, rotor yokes 1121, 1122 are linked to be unified with the deflection phase at the outer circumference of the openings of rotor yokes 1121, 1122 matched. After this, shaft 1110 is fixed (press-fit) penetrating through the center of rotor yokes 1121, 1122.

With such a structure, rotor yokes 1121, 1122 are linked with joint material 1123 to be unified, thereby accurately controlling the dimensions of the outer circumference of rotor yokes 1121, 1122 unified, which prevents impossible assembling of the rotor magnet.

Outer circumferential deflection at the openings of rotor yokes 1121, 1122 is rectified to reduce imbalance of rotor 1100, thereby decreasing vibration and noise during operation. Unifying by a joint material increases rigidity. Consequently, a motor is available with high responsivity owing to a small inertia moment of the rotor with a hollow structure, and with high durability against vibration and shock owing to lightweight and high rigidity of the rotor. Further, the rigidity of the rotor yoke assembly is increased, which allows the rotor yoke to be more thin-walled and lightweight than before, thereby further improving responsivity.

In addition, producing rotor yokes 1121, 1122 with the same shape requires only one type of mold. This mold requires only a shallow depth when forming a rotor yoke into a cup shape, which is advantageous in accuracy of the product, durability of the mold, and cost of the mold.

Here, the depth (how deeply the internal diameter is enlarged from the opening) of internal diameter enlarged part 1122w is preferably smaller than the height of joint material 1123. Contrarily, if the depth of internal diameter enlarged part 1122w is larger than the height of joint material 1123, entire joint material 1123 is completely contained in rotor yoke 1122 when inserted, possibly causing incomplete fitting of joint material 1123 with rotor yoke 1121. The situation is the same with internal diameter enlarged part 1121w.

On the other hand, in the assumption that joint material 1123 is inserted into a rotor yoke without internal diameter enlarged parts 1121w, 1122w, entire joint material 1123 is completely contained in either one of rotor yokes 1121, 1122 in the same way as in the above-described case (deep depth), possibly disabling rotor yokes 1121, 1122 to be linked with joint material 1123. Hence, internal diameter enlarged parts 1121w, 1122w with an appropriate depth are required.

Second Exemplary Embodiment

Figure 3:
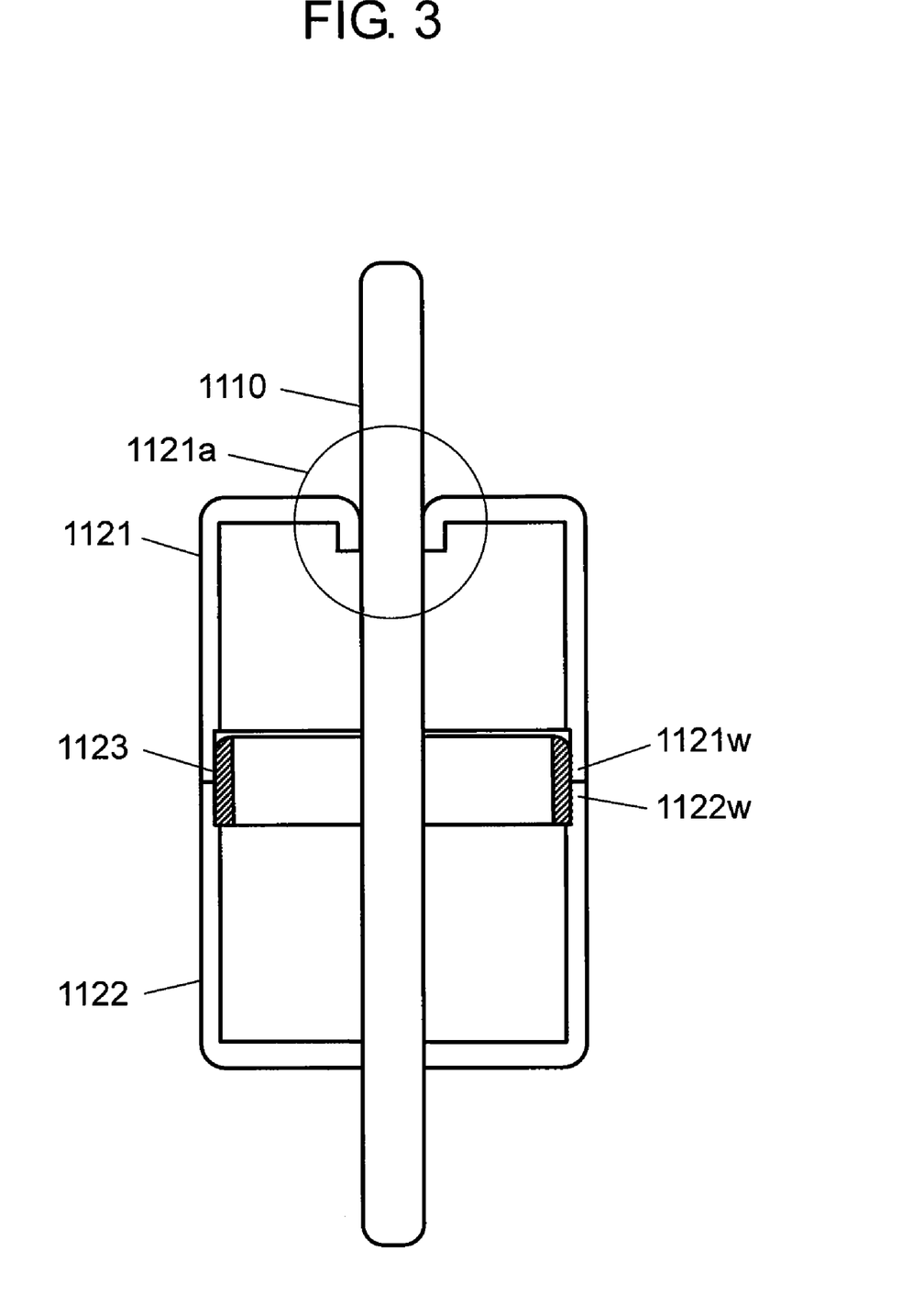
FIG. 3 is a main cross-sectional structural drawing of a rotor yoke assembly according to the second exemplary embodiment of the present invention.

FIG. 3 is a cross-sectional structural drawing showing the structure of the rotor yoke assembly of a motor according to the second exemplary embodiment of the present invention.

In FIG. 3, rotor yoke 1121 molded in a cup shape has projection 1121a for fixing shaft 1110 at the center of rotor yoke 1121, while the other rotor yoke 1122 does not have a projection. That is, rotor yoke 1122 is formed so that fixing strength exerted on shaft 1110 is weaker than rotor yoke 1121. In the same way as in the first embodiment, after rotor yokes 1121, 1122 are linked with joint material 1123 at internal diameter enlarged parts 1121w, 1122w to be unified, shaft 1110 is fixed (press-fit) penetrating through the center of rotor yokes 1121, 1122.

By placing projection 1121a for fixing the shaft only on one of two cup-shaped rotor yokes 1121, 1122, the fixing strength exerted on the shaft of the other rotor yoke 1122 without a projection provided is weak. Consequently, when linking two rotor yokes 1121, 1122 with joint material 1123, outer circumferential deflection of the rotor yoke without a projection is corrected and rectified in accordance with the outer circumferential deflection of the rotor yoke with a projection. This prevents impossible assembling of the rotor magnet.

With this structure, the outer circumferential dimensions of rotor yokes 1121, 1122 linked to be unified are accurately constant, which prevents impossible assembling of the rotor magnet. Deflection of rotor yoke 1122 without a projection is corrected and rectified in accordance with deflection of rotor yoke 1121 with a projection, which reduces imbalance of the rotor. The reduced imbalance of rotor 1100 decreases vibration and noise during operation, while unifying with a joint material increases the rigidity. A motor is available with high responsivity owing to a small inertia moment of the rotor with a hollow structure, and with high durability against vibration and shock owing to lightweight and high rigidity of the rotor.

Third Exemplary Embodiment

Figure 4:
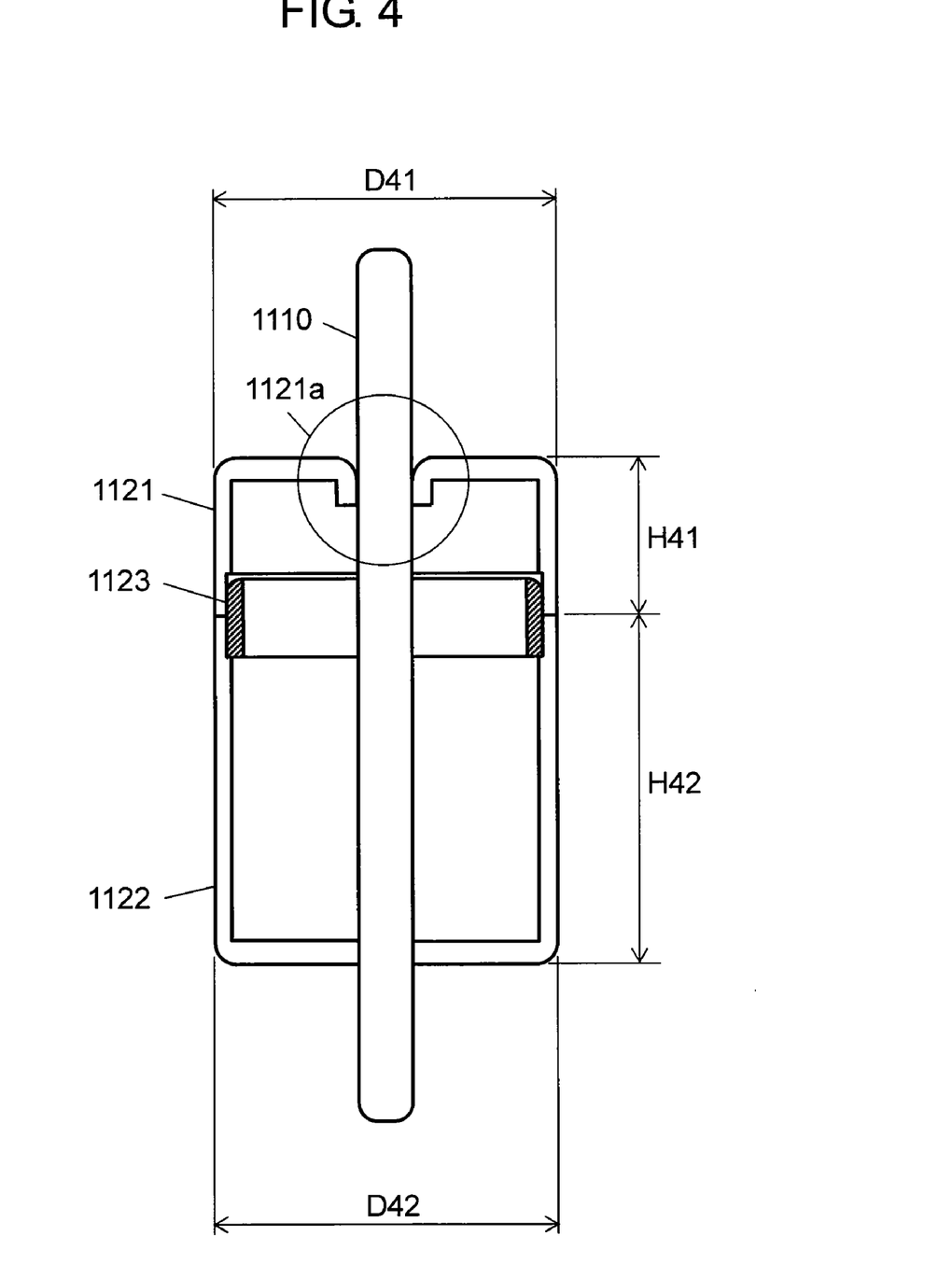
FIG. 4 is a cross-sectional structural drawing of a rotor yoke assembly according to the third exemplary embodiment of the present invention.

FIG. 4 is a cross-sectional structural drawing showing the structure of the rotor yoke assembly of a motor according to the third embodiment of the present invention.

In FIG. 4, rotor yoke 1121 molded in a cup shape has projection 1121a for fixing shaft 1110 at the center of rotor yoke 1121, while the other rotor yoke 1122 does not have a projection. That is, rotor yoke 1122 is formed so that fixing strength exerted on shaft 1110 is weaker than rotor yoke 1121.

Rotor yoke 1121 with projection 1121a is formed so that height H41 of rotor yoke 1121 is equal to or smaller than diameter D41 of rotor yoke 1121. Rotor yoke 1122 without a projection has diameter D42 same as that of rotor yoke 1121, while its height H42 is larger than height H41. In the same way as in the first embodiment, after rotor yokes 1121, 1122 are linked with joint material 1123 to be unified, shaft 1110 is fixed (press-fit) penetrating through the center of rotor yokes 1121, 1122.

With this structure, when shaft 1110 is fixed (press-fit) penetrating through the center of rotor yokes 1121, 1122, deflection of rotor yoke 1122 without a projection is corrected and rectified in accordance with deflection of rotor yoke 1121 with a projection. On this occasion, rotor yoke 1121 with a projection is formed so that height H41 is equal to or smaller than diameter D41, and thus outer circumferential deflection at the opening of rotor yoke 1121 can be made smaller than that in the first embodiment. This prevents impossible assembling of the rotor magnet and further decreases imbalance of rotor 1100, thereby reducing vibration and noise during operation.

Meanwhile, rotor yoke 1122 without a projection is formed so that height H42 is larger than height H41 of rotor yoke 1121 with projection 1121a. Accordingly, even if rotor yoke 1121 is formed so that height H41 is equal to or smaller than diameter D41, the height of the outer circumference of rotor yokes 1121, 1122 linked to be unified, defined by the sum of the heights of two rotor yokes 1121, 1122 is not constrained by diameter D41 of rotor yoke 1121. Accordingly, even if the height of a rotor magnet incorporated is twice or more diameter D41 of rotor yoke 1121, arrangement is made so that the height of the outer circumference of the rotor yokes unified is larger than the height of the rotor magnet to ensure a required magnetic circuit.

Further, a motor is implemented with high rigidity owing to unifying the rotor yokes with a joint material, with high responsivity owing to a small inertia moment of the rotor with a hollow structure, and with high durability against vibration and shock owing to lightweight and high rigidity of the rotor.

Fourth Exemplary Embodiment

Figure 5:
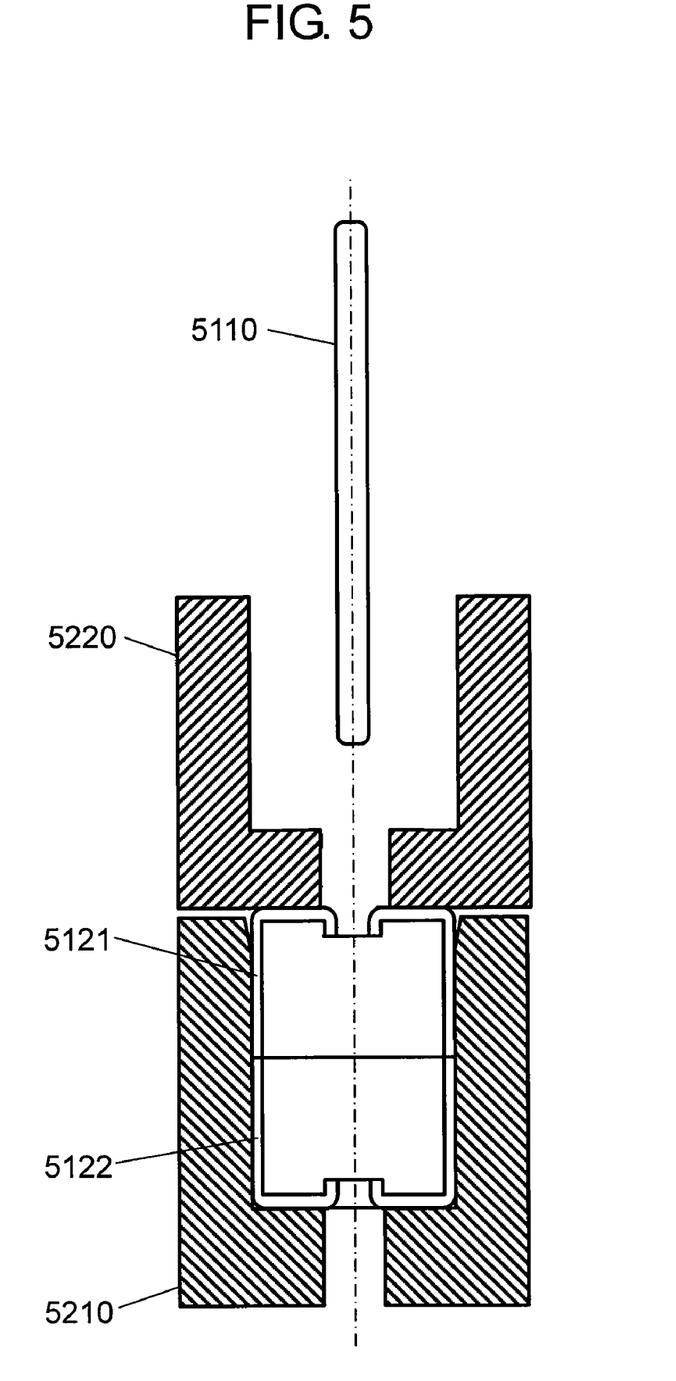
FIG. 5 is a cross-sectional structural drawing for illustrating a method of assembling a rotor yoke assembly according to the fourth exemplary embodiment of the present invention.

FIG. 5 is a cross-sectional structural drawing showing a method of assembling the rotor yoke assembly of a motor according to the fourth embodiment of the present invention.

In FIG. 5, rotor yokes 5121, 5122 molded in a cup shape are inserted into assembly jig (lower side) 5210 before shaft 5110 is fixed (press-fit) penetrating through their center. Assembly jig 5210 is a type of mold finished extremely accurately in dimensions. The cylinder-shaped space into which rotor yokes 5121, 5122 are inserted is finished extremely accurately in its circular form. Under the circumstances, even if the outer circumferences of rotor yokes 5121, 5122 are deflected to deform, the outer circumferences are regulated to a roughly perfect circle. That is, rotor yokes 5121, 5122 are retained with their outer circumferential deflection rectified. Then, shaft 5110 is fixed (press-fit) penetrating through the center of rotor yokes 5121, 5122 with rotor yokes 5121, 5122 pressed in the direction of the shaft penetrating by assembly jig (upper side) 5220.

With outer circumferential deflection of two rotor yokes restricted, the shaft is fixed while retaining these two rotor yokes to form a rotor yoke assembly. As a result, outer circumferential deflection of two rotor yokes together can be corrected and rectified easily and reliably.

With this structure, rotor yokes 5121, 5122 contact each other at their end faces of the openings with outer circumferential deflection rectified. Consequently, even when shaft 5110 is fixed (press-fit) penetrating the center of rotor yokes 5121, 5122, each of them interferes with the other to rectify and compensate deformation (enlarged outer circumferential deflection) of the other, which prevents impossible assembling of the rotor magnet.

Further, a motor is implemented with reduced vibration and noise during operation owing to rectified outer circumferential deflection of rotor yokes 5121, 5122 and to decreased imbalance of the rotor, with high responsivity owing to a small inertia moment of the rotor with a hollow structure, and with high durability against vibration and shock owing to lightweight and high rigidity of the rotor.

Fifth Exemplary Embodiment

Figure 6:
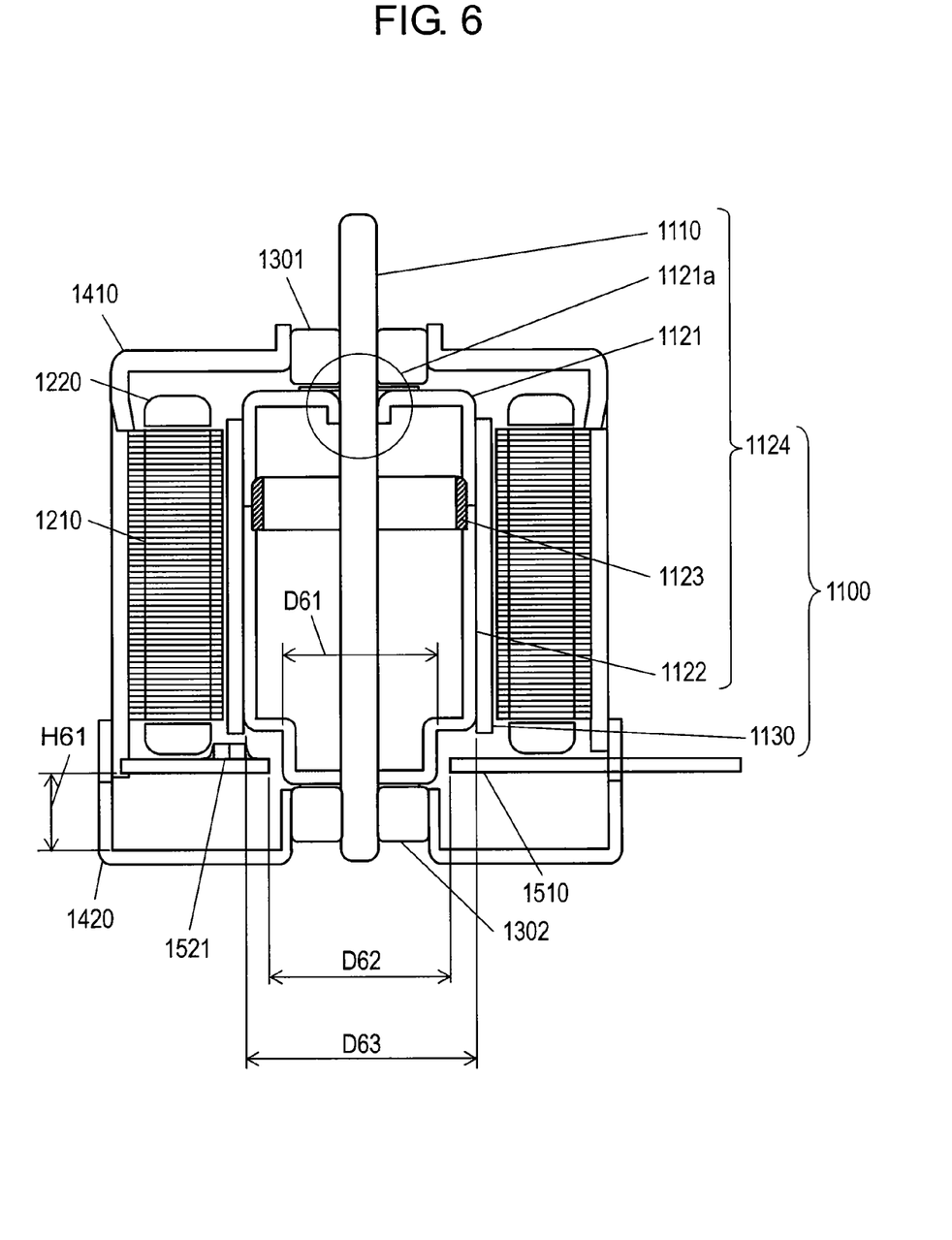
FIG. 6 is a cross-sectional structural drawing of a motor according to the fifth embodiment of the present invention.

FIG. 6 is a cross-sectional structural drawing of a motor according to the fifth exemplary embodiment of the present invention. In FIG. 6, a component performing the same function as that in FIG. 1 is given the same reference mark as that in FIG. 1, and thus its description is omitted.

In FIG. 6, rotor yoke 1121 molded in a cup shape has projection 1121a for fixing shaft 110 at the center of rotor yoke 1121 while the other rotor yoke 1122 does not have a projection, and rotor yoke 1122 is formed so that a fixing strength exerted on shaft 1110 is weaker than rotor yoke 1121.

Rotor yoke 1122 without a projection has an extended part with diameter D61 smaller than internal diameter D63 of magnet 1130. Rotor yoke 1122 is open into printed-circuit board 1510 and makes the extended part of rotor yoke 1122 penetrate through a hole with diameter D62 larger than the diameter of the extended part of rotor yoke 1122. Further, in rotor yoke 1122, the end face of the extended part of rotor yoke 1122 is used as a thrust bearing material. In the same way as in the first embodiment, rotor yokes 1121, 1122 are linked with joint material 1123 to be unified, and then shaft 1110 is fixed (press-fit) penetrating through the center of rotor yokes 1121, 1122.

With this structure, unifying the rotor yokes with a joint material prevents impossible assembling of rotor magnet 1130, and furthermore increases the rigidity. Deflection during rotation of rotor yoke 1122 without a projection is corrected and rectified in accordance with that of rotor yoke 1121 with a projection, which decreases imbalance of rotor 1100 to reduce vibration and noise during operation. Simultaneously, this brings about high responsivity owing to a small inertia moment of rotor 1100 with a hollow structure and high durability against vibration and shock owing to lightweight and high rigidity of rotor 1100.

Rotor yoke assembly 1124 structured like one rigid body is free from a fixed position possibly moving when vibration and shock are exerted in the thrust direction, thereby implementing a brushless motor with high durability against vibration and shock.

Frames 1410, 1420 have bearings 1301, 1302 arranged thereon supporting shaft 1110 of rotor 1100, where rotor 1100 is rotatably retained. 1521 is a magnetoelectric transducer for detecting the position of the magnetic pole of magnet 1130, mounted on printed-circuit board 1510 to transmit a signal representing the position of the magnetic pole of the rotor to the motor driving circuit (not shown).

This brushless motor is unified with printed-circuit board 1510, similarly to the second conventional example. In the printed-circuit board of the second conventional example shown in FIG. 10, diameter D102 of a hole bored in printed-circuit board 1510 is set to a minimum diameter larger than diameter D101 of the thrust ring. However, in rotor yoke 1122 of this embodiment without a projection, diameter D62 of a hole in printed-circuit board 1510 can be decreased by decreasing diameter D61 of the extended part. Consequently, diameter D62 is smaller than D102 in the conventional example. As a result, the mounting area for electronic components on printed-circuit board 1510 can be increased. Further, absence of a projection facilitates obtaining accuracy such as in flatness and squareness of the part functioning as a thrust bearing.

Sixth Exemplary Embodiment

Figure 7A:
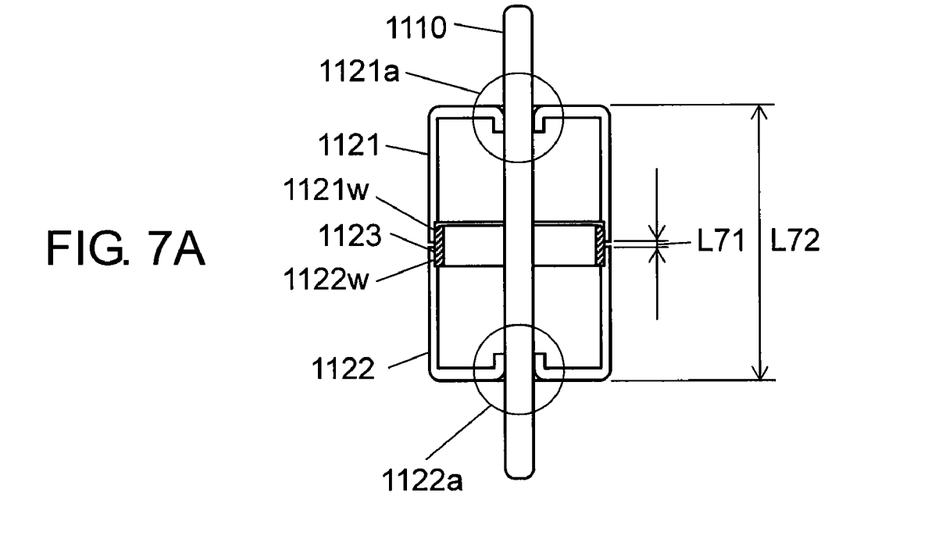
FIG. 7A is a cross-sectional structural drawing of a rotor yoke according to the sixth exemplary embodiment of the present invention.
Figure 7B:
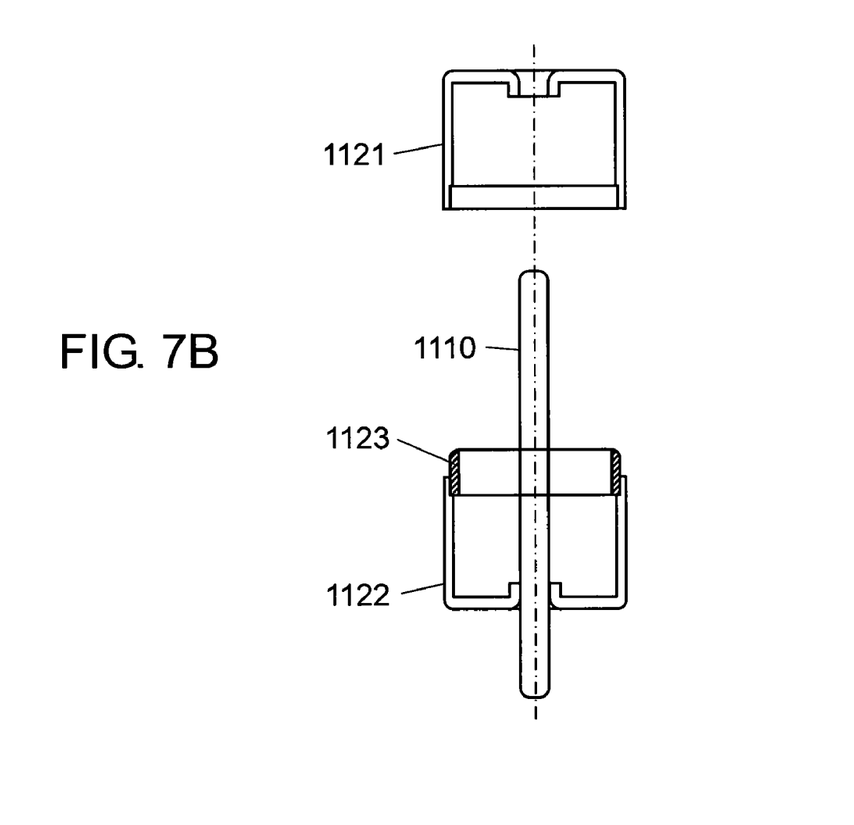
FIG. 7B is a cross-sectional structural drawing for illustrating a method of assembling a rotor yoke according to the sixth embodiment of the present invention.

FIG. 7A is a cross-sectional structural drawing of the rotor yoke of a motor according to the sixth embodiment of the present invention. FIG. 7B is an explanatory diagram of a method of assembling the rotor yoke.

In FIG. 7A, rotor yokes 1121, 1122 molded in a cup shape has projections 1121*a*, 1122*a* for fixing (press-fitting) shaft 1110 at the center of rotor yokes 1121, 1122. When fixing (press-fitting) shaft 1110, rotor yoke 1122 and shaft 1110 are preliminarily fixed (press-fit) as shown in FIG. 7B, and then rotor yoke 1121 is fixed (press-fit) with joint material 1123 placed between rotor yoke 1122 and rotor yoke 1121. In this case, each opening of rotor yokes 1121, 1122 is not made touch the other, but shaft 1110 is fixed to the center of rotor yokes 1121, 1122 in a state spaced by a gap as shown by L71 in FIG. 7A to form rotor yoke assembly 1124. Here, when assembling these components, a jig same as assembly jig (lower side) 5210 described in FIG. 5 is used to hold rotor yoke 1121 with outer circumferential deflection rectified.

This structure enables length L72 in FIG. 7A to be constant. That is, even if height H41, H42 (refer to FIG. 4) of rotor yokes 1121, 1122 varies, the variation can be absorbed when assembling to make L71 constant. In this way, length L72 in FIG. 7A can be set regardless of the dimensions of rotor yokes 1121, 1122, and thus the end play can be accurately set when the end face of rotor yoke assembly 1124 is used as a thrust bearing material. Consequently, durability against vibration parallel to the shaft can be enhanced.

In order to assemble as described above, the sum of height H41 and H42 of rotor yokes 1121, 1122 is preliminarily set to a value smaller than L72 even when the dimensions of rotor yokes 1121, 1122 are at a maximum due to manufacturing variations. Meanwhile, the sum of the depths of internal diameter enlarged parts 1121*w* and 1122*w* is preferably set to a value larger than the height of joint material 1123 even when the dimensions of rotor yokes 1121, 1122 are at a minimum due to manufacturing variations.

Further, rotor yokes 1121, 1122 are linked with joint material 1123 to be unified, thus preventing impossible assembling of the rotor magnet. Outer circumferential deflection at the openings of rotor yokes 1121, 1122 is rectified and imbalance of rotor 1100 is decreased to reduce vibration and noise during operation. Unifying rotor yokes 1121, 1122 like one rigid body with a joint material increases rigidity. With the above structure, a motor is provided with high responsivity owing to a small inertia moment of the rotor with a hollow structure, and with high durability against vibration and shock owing to lightweight and high rigidity of the rotor.

Hereinbefore, the description is made of a case where the rotor yoke has a projection for fixing the shaft. However, the present invention is also applicable to a case where another component is provided for fixing the rotor yoke and shaft.

With a motor structured as described in each embodiment above, the inertia moment of the rotor is reduced and the responsivity of the actuator in itself is improved for a motor for driving an actuator used such as for a throttle valve of an automobile engine and an optical axis controller of an automobile headlight. Furthermore, the weight can be reduced of a motor's rotor, which is heaviest and weakest against vibration and shock among components composing an actuator, and thus durability of the actuator in itself against vibration and shock is improved.

The invention is applicable to any actuator as long as it exerts a physical movement on a mechanical structure or changes a physical position of a mechanical structure such as by means of a servomotor. Actually, many structures are formed by unifying an actuator and a servomotor. The invention is extremely suitable for such a structure as well.

INDUSTRIAL APPLICABILITY

With a motor for driving an actuator according to the present invention, responsivity and durability against vibration and shock can be improved, and thus useful as a motor for driving an actuator used such as for a throttle valve of an automobile engine and an optical axis controller of an automobile headlight. Further, with high responsivity owing to a small inertia moment, the invention is also useful for a motor for driving a mechanism in an office appliance such as a printer and copy machine; a motor for driving a joint in an manipulator and small-size robot.

The invention claimed is:

1. A brushless motor comprising:
   a rotor including two cup-shaped rotor yokes each including an internal diameter enlarged part at an opening thereof, and a ring-shaped joint material an external diameter of which fits into the internal diameter enlarged part, wherein the rotor is formed by fixing a magnet on an outer circumference of a yoke assembly formed by linking the openings of the two rotor yokes facing each other while inserting the joint material into both internal diameter enlarged parts of the two rotor yokes, and by fixing a shaft to each center of the two rotor yokes linked;
   a stator arranged facing the magnet, made of an iron core with a coil wound therearound;
   a bearing supporting the shaft of the rotor; and
   a frame into which the stator is inserted, holding the bearings at both ends thereof.

2. The brushless motor of claim 1, wherein a projection is placed for fixing the shaft only at one of the two rotor yokes.

3. The brushless motor of claim 2, wherein the first rotor yoke on which the projection is placed is formed so that a height of the first rotor yoke is equal to or smaller than a diameter of the first rotor yoke, and wherein the second rotor yoke is formed so that a height of the second rotor yoke is larger than a height of the first rotor yoke.

4. The brushless motor of claim 2, wherein a rotor yoke assembly is formed by fixing a shaft while retaining the two rotor yokes with outer circumferential deflection of the two rotor yokes restricted.

5. The brushless motor of claim 1, wherein
   a printed-circuit board is provided on which a magneto-electric transducer is mounted for detecting a position of the magnetic pole of a magnet fixed to the rotor; an extended part is provided on the rotor yoke facing the printed-circuit board, with a diameter smaller than an internal diameter of the magnet; a hole larger than the extended part of the rotor yoke is provided in the printed-circuit board to make the extended part of the rotor yoke penetrate through the hole; and an end face of the extended part is used as a thrust bearing material.

6. The brushless motor of claim 1, wherein the rotor yoke assembly is formed by linking the two rotor yokes with the end face of the openings of the two rotor yokes and by fixing the shaft.

7. An actuator including the brushless motor of claim 1.

8. The brushless motor of claim 3, wherein a rotor yoke assembly is formed by fixing a shaft while retaining the two rotor yokes with outer circumferential deflection of the two rotor yokes restricted.

9. The brushless motor of claim 2, wherein
   a printed-circuit board is provided on which a magneto-electric transducer is mounted for detecting a position of the magnetic pole of a magnet fixed to the rotor; an extended part is provided on the rotor yoke facing the printed-circuit board, with a diameter smaller than an internal diameter of the magnet; a hole larger than the extended part of the rotor yoke is provided in the printed-circuit board to make the extended part of the rotor yoke penetrate through the hole; and an end face of the extended part is used as a thrust bearing material.

10. The brushless motor of claim 3, wherein
    a printed-circuit board is provided on which a magneto-electric transducer is mounted for detecting a position of the magnetic pole of a magnet fixed to the rotor; an extended part is provided on the rotor yoke facing the printed-circuit board, with a diameter smaller than an internal diameter of the magnet; a hole larger than the extended part of the rotor yoke is provided in the printed-circuit board to make the extended part of the rotor yoke penetrate through the hole; and an end face of the extended part is used as a thrust bearing material.

* * * * *